F. G. TIMM.
SHIELD FOR CORN CULTIVATORS.
APPLICATION FILED DEC. 21, 1908.
927,296.
Patented July 6, 1909.
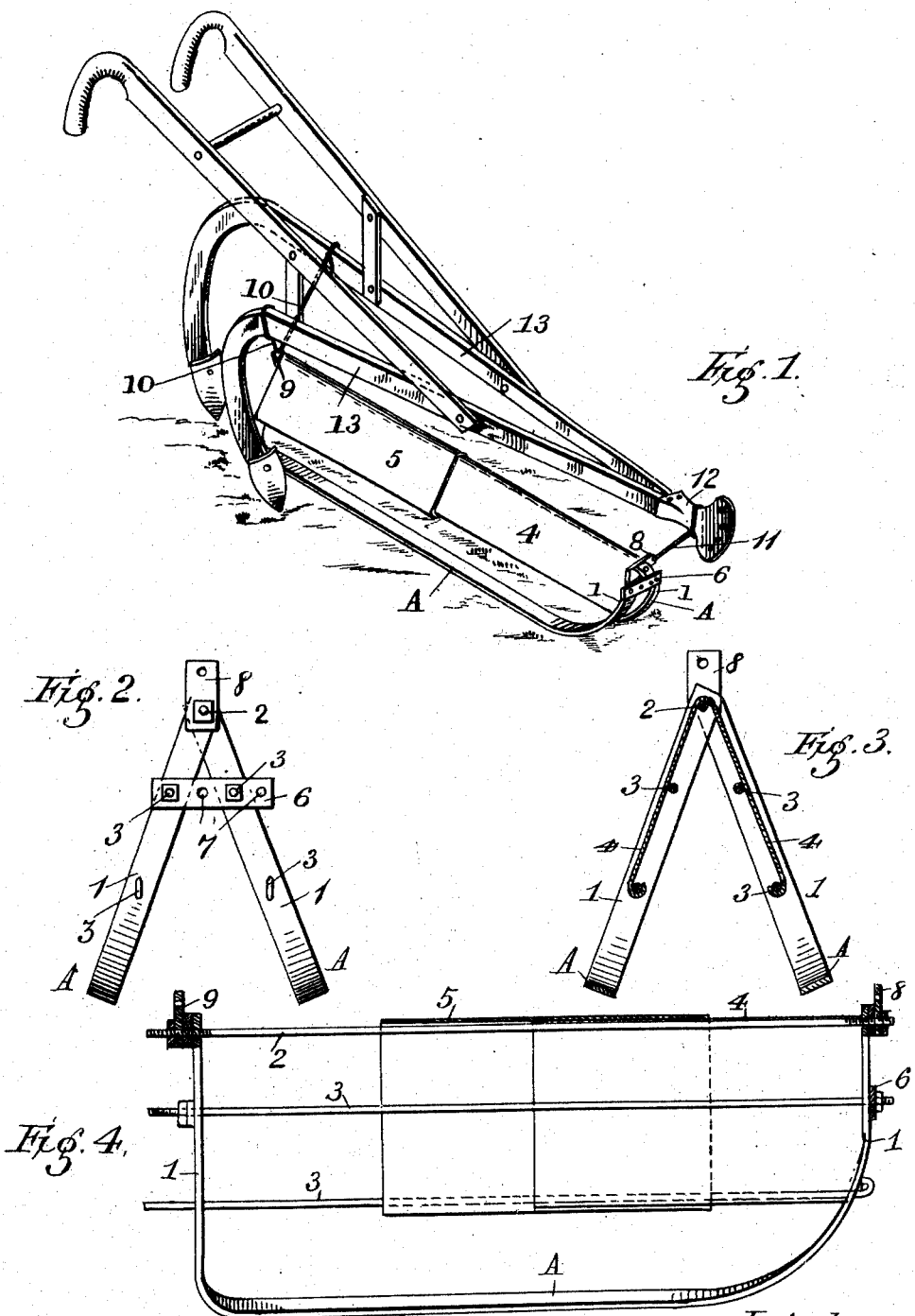
Witnesses:
F. L. Ourand.
M. K. Freeman
Inventor,
Ferdinand G. Timm
By Louis Bagger & Co.
his Attorneys

UNITED STATES PATENT OFFICE.

FERDINAND G. TIMM, OF MINNEAPOLIS, MINNESOTA.

SHIELD FOR CORN-CULTIVATORS.

No. 927,296.        Specification of Letters Patent.        Patented July 6, 1909.

Application filed December 21, 1908. Serial No. 468,582.

*To all whom it may concern:*

Be it known that I, FERDINAND G. TIMM, a citizen of the United States, residing at Minneapolis, in the county of Hennepin and State of Minnesota, have invented certain new and useful Improvements in Shields for Corn-Cultivators, of which the following is a specification.

My invention relates to an improvement in shields for corn cultivators, and the object is to provide means whereby the earth will be distributed along rows of the corn in quantities desired and at the same time prevent large clods of earth being thrown against the corn and breaking it.

The invention consists of certain novel features of construction and combinations of parts which will be hereinafter described and pointed out in the claims.

In the accompanying drawings—Figure 1 is a perspective view showing my invention applied to a cultivator; Fig. 2 is an end view; Fig. 3 is a cross sectional view, and Fig. 4 is a view in side elevation showing the fenders.

A, A, represent runners having the ends 1, 1 thereof projecting upwardly, and the ends are connected together by a ridge rod 2 forming a frame. The ends of each runner are connected together by rods 3, 3, which extend longitudinally of the frame. Fenders 4 and 5 extend over the ridge rod 2 and along the sides of the frame. The fender 4 has the lower edges thereof bent around the lower rods 3 for holding the fender in position. This fender is intended to be held stationary upon the frame. The fender 5 is connected to the lower rods 3 in a similar manner, but it is capable of sliding along the rods and over the fender 4, the fender 5 overlapping one end of the fender 4, and the lower edges of the fender 5 are bent so as to permit of the fender 5 sliding along the rods 3 and over the fender 4. A plate 6 is connected to one end of the frame by the upper rods 3. The plate is provided with several openings 7 permitting of the runners being adjusted either outwardly or inwardly as occasion requires. Clips 8 and 9 are connected at each end of the frame to the rod 2. The clip 9 is connected to the rear end of the frame, and extending from the clip are two ropes or chains 10, 10 for suspending the shield or frame on the shovel beams 13 of the cultivator. Connected to the clip 8 is a rope or chain 11, which is connected to the beam 12 of the cultivator for suspending the forward end. By means of these ropes the shield may be raised or lowered to suit the requirements. The lower rods 3 are removably connected to the frame, and when it is desired to remove either or both of the fenders the lower rods may be withdrawn from the ends of the runners, thereby disconnecting the fenders from the frame.

The fine earth broken by the shovels of the cultivator will pass through the shields between the lower rods 3 and the runners discharging the earth along the rows of corn. If it is desired that a greater quantity of earth be discharged along the rows of corn the movable shield 5 may be slid along the rods and upon the stationary shield 4, making a sufficient opening for the discharge of the earth therethrough. When the movable shield is slid along the frame and upon the stationary shield, larger clods of earth can pass through the frame and along the rows.

It is evident that slight changes might be made in the form and arrangement of the several parts described without departing from the spirit and scope of my invention, and hence I do not wish to be limited to the exact construction herein set forth, but:—

Having fully described my invention, what I claim as new and desire to secure by Letters Patent is:—

1. In a shield for corn cultivators, the combination with a frame having runners thereon, of a fender mounted on the frame and adjustable longitudinally of the frame.

2. In a shield for corn cultivators, the combination with a frame having runners, of fenders mounted on the frame, and one of the fenders movable longitudinally of the frame.

3. In a shield for corn cultivators, the combination with a frame having runners, of fenders mounted on the frame, rods connected to the fenders for retaining them in position, and one of the fenders movable on the frame.

4. In a shield for corn cultivators, the combination with runners having upturned ends, a ridge rod connecting the ends of the runners together, means adjustably connecting the runners together, of fenders, rods for retaining the fenders in position, and one of the fenders slidable upon the rods.

5. In a shield for corn cultivators, the combination with a frame having runners, of fenders mounted thereon, one of the fenders slidable upon the frame, means for adjusting the width of the frame, and means for suspending the frame.

6. In a shield for corn cultivators, the combination with runners having upturned ends, a ridge rod connecting the ends of the runners together, means adjustably connecting the runners together, of fenders, rods for retaining the fenders in position, and one of the fenders slidable upon the rods, and means for suspending the frame.

In testimony whereof I affix my signature, in the presence of two witnesses.

FERDINAND G. TIMM.

Witnesses:
F. W. J. HOUGH,
PRESTON COOPER.